W. M. AND M. M. BURDON.
LIQUID FUEL FURNACE.
APPLICATION FILED AUG. 3, 1913.
1,310,152.
Patented July 15, 1919.
5 SHEETS—SHEET 2.
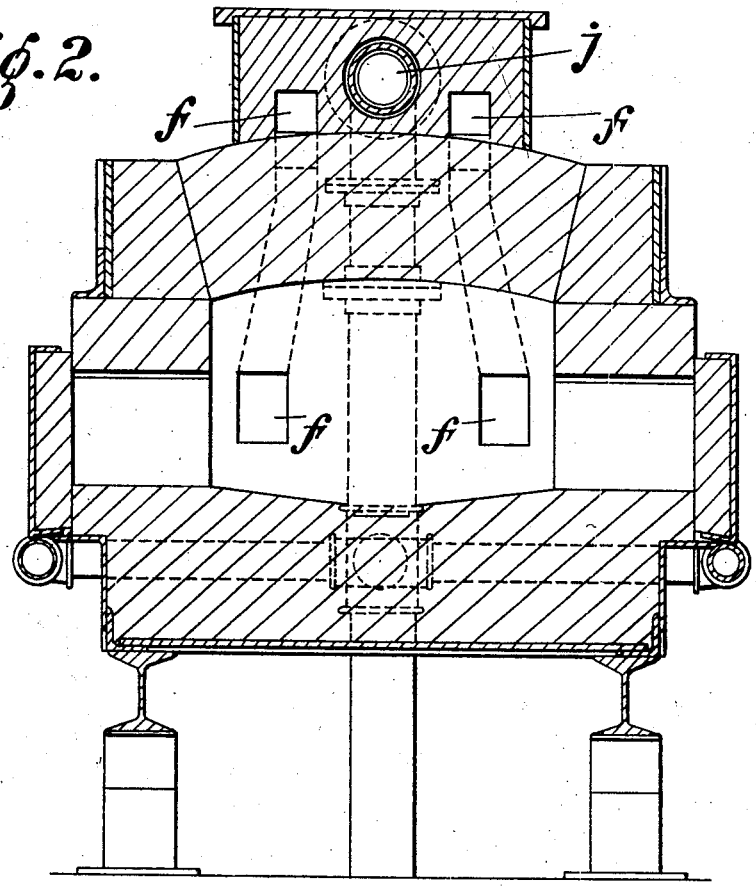
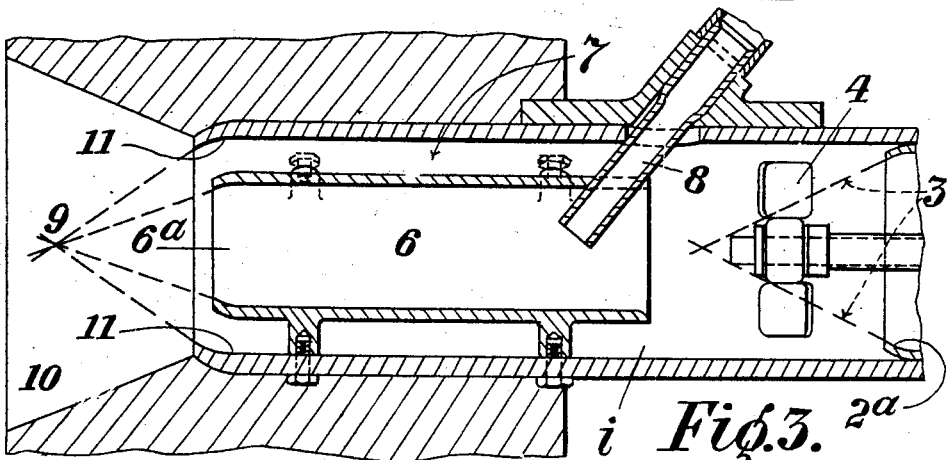

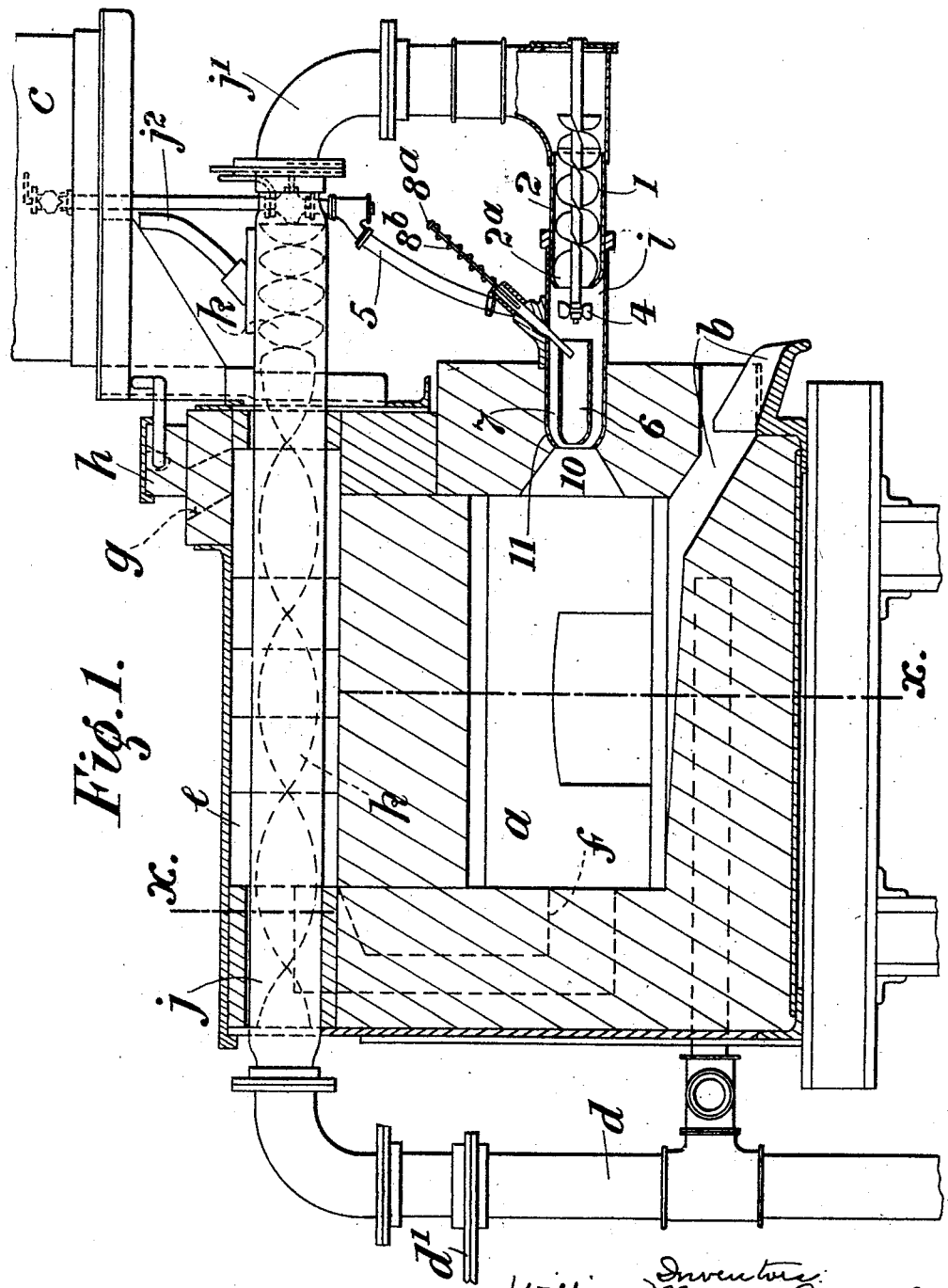

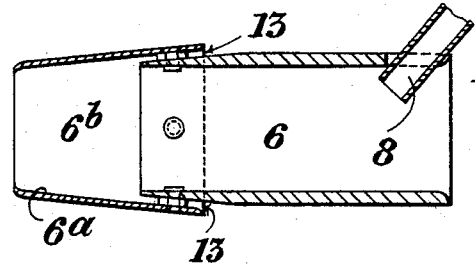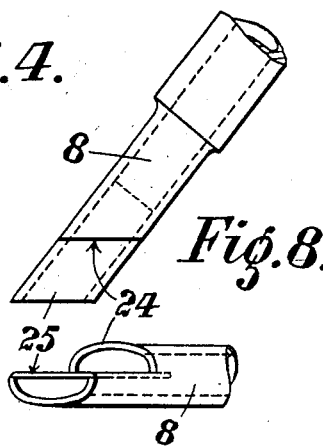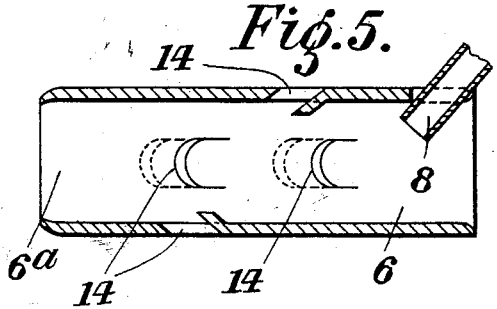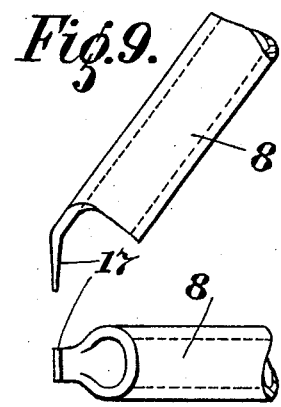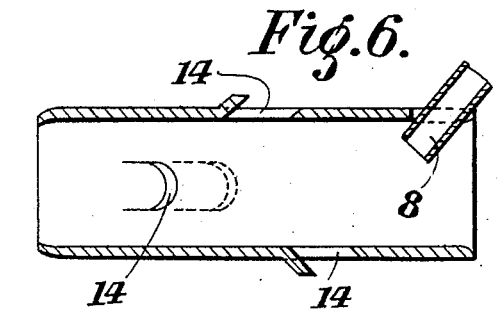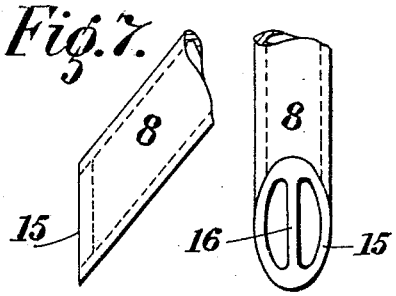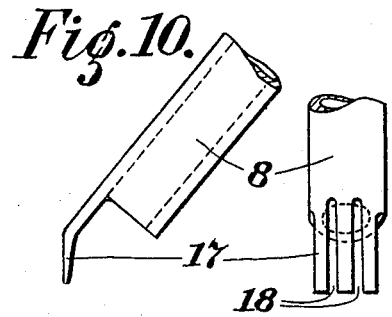

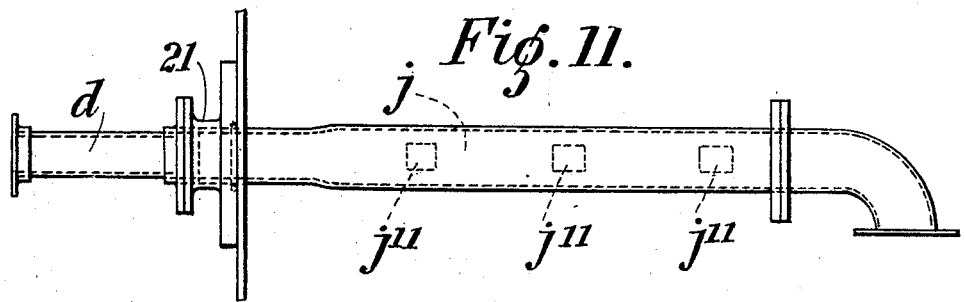
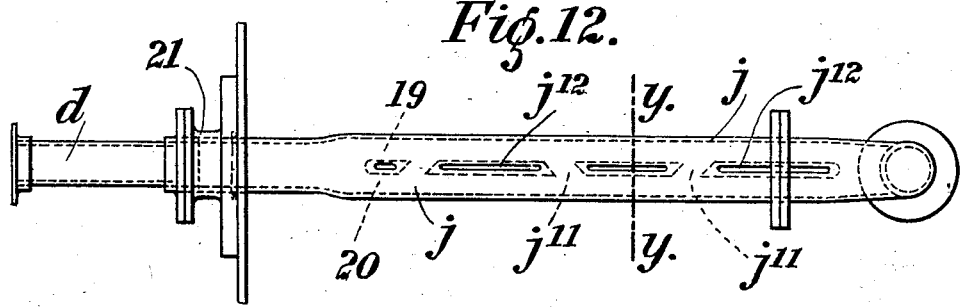
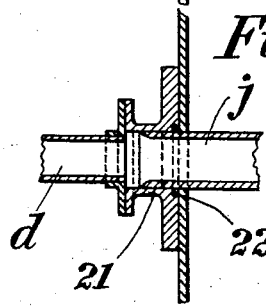
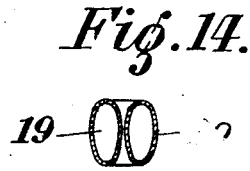
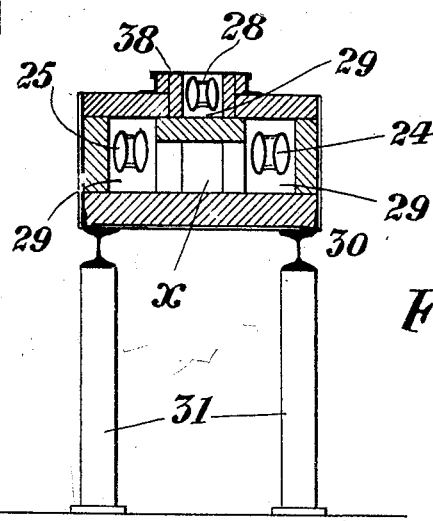

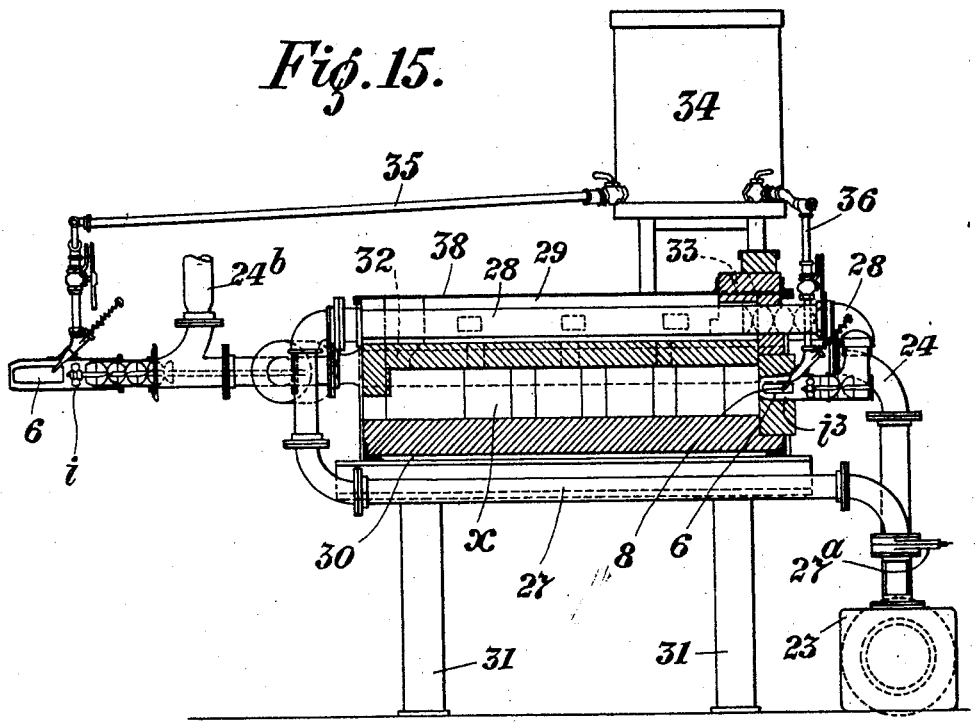
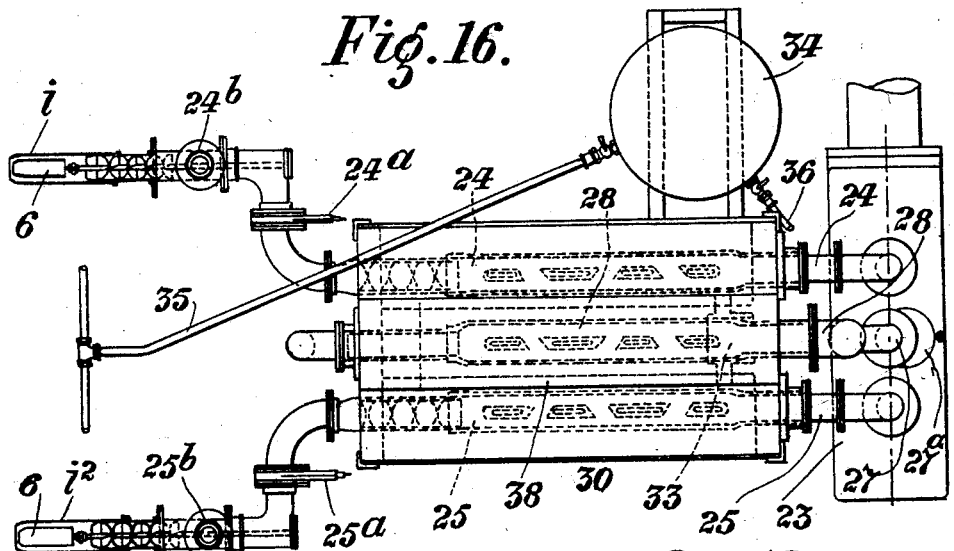

UNITED STATES PATENT OFFICE.

WILLIAM M. BURDON AND MATTHEW M. BURDON, OF BELLSHILL, SCOTLAND, ASSIGNORS TO BURDON'S LIMITED, OF BELLSHILL, SCOTLAND.

LIQUID-FUEL FURNACE.

1,310,152. Specification of Letters Patent. Patented July 15, 1919.

Application filed August 3, 1918. Serial No. 248,120.

*To all whom it may concern:*

Be it known that we, WILLIAM MURRAY BURDON and MATTHEW MURRAY BURDON, both of Bellshill, Lanarkshire, Scotland, and both subjects of the King of Great Britain, have invented certain new and useful Improvements in Liquid-Fuel Furnaces, of which the following is a specification.

Heretofore creosote, gas oil and like fuel oils have been largely used for heating furnaces, boilers, etc., but owing to the high price and the increasing difficulty of supplying such oils there has arisen an urgent demand for the utilization of heavy tar and pitch oils for heat raising purposes, especially there has been a demand for the use of what is known as "spent oils" charged with a large proportion say from 30% to 75% of pitch. Present methods are not suitable for effectively utilizing such oils.

We have spent much time and made numerous experiments with the object of using such pitch oils and we have succeeded in devising a method and apparatus whereby this can be done; in fact, the results have exceeded our expectations as we find we can, with this cheap and previously unsuitable oil, obtain equal if not better results than with the higher priced creosote and other oils.

Under our invention we direct a considerable volume of air, at a medium pressure, (say about 13" water gage) and heated to a temperature somewhat above the flash point temperature of the oil, into a, preferably, cylindrical carbureter to which also the oil is supplied either by gravity, or induction, or both, the carbureter being located within an air nozzle, or its equivalent, through which a portion of the heated air also passes outside the carbureter. The air before entering the carbureter is caused to rapidly gyrate and is or may be also agitated and the gyrating air impinges on and carries the oil, under centrifugal action, around the interior of the carbureter, the oil being thoroughly atomized and more or less completely vaporized by intimate admixture with the gyrating heated air. The more or less vaporized oil issues from the carbureter as a thin circular film mixed with and carried around by the inner body of air and the whole is directed to a point of convergence, which we term the gasification point, located preferably, within the furnace, while, at the same time the other portion of the gyrating heated air, after flowing along outside the carbureter, also impinges on the film of vaporized oil with the result that the oil vapor is intimately mixed with and blanketed, as it were, between inner and outer bodies or streams of heated air, the whole being directed toward the one point where the streams meet and clash together, and produce a more or less complete gasification of the oil which burns, in intimate admixture with the air, and gives off an intense heat.

In order that the invention may be clearly understood we have, on the drawings annexed, shown, by way of example, a conventional form of oil gas furnace as used for heating metals and which has our improvements applied thereto and we have also shown an oil gas producer.

Figure 1 is a vertical longitudinal section of the furnace with parts thereof shown in side elevation.

Fig. 2 is a cross sectional elevation taken on the line $x$, $x$, Fig. 1.

Fig. 3 is an enlarged view of the air nozzle with its internal carbureter.

Figs. 4, 5, and 6 show modified forms of the carbureter.

Figs. 7, 8, 9 and 10 show different forms of the oil inlet nozzle.

Fig 11 is a side elevation, and

Fig. 12 a plan of an air heating conduit.

Fig. 13 is a cross section of the telescopic joint of the conduit.

Fig. 14 is a cross section on the line $y$, $y$, Fig. 12.

Fig. 15 is a sectional elevation of an oil gas producer with our improvements.

Fig. 16 is a plan of the same with parts shown in section.

Fig. 17 is a cross section.

Referring to the drawings:—

$a$ is the furnace with discharge spout $b$, oil supply tank $c$ and air supply pipe $d$ with hand operated air controlling valve $d^1$. $e$ is a hot chamber at the top of the furnace to which the furnace gases can pass by the flues $f$ and then escape by means of the outlet $g$ which is controlled by a damper $h$.

The air passing by the pipe $d$ to the air nozzle $i$ is heated in its passage through the conduit or pipe $j$ located in the hot chamber and the heated air passes by the bend $j^1$ to the nozzle. The air is supplied from any suitable source at a moderate pressure, say about 13″ water gage. Spiral retarders $k$ can be placed in the pipe $j$ to delay the passage of the air therethrough for a sufficient length of time to enable it to be highly heated; these retarders being shown in dotted lines. The heating arrangement is such that the air is heated to a temperature somewhat above the flash point temperature of the oil.

Under this invention the heated air passes first through a nozzle 2 which is bent or tapered inwardly at its end $2^a$ and, in its passage, is caused, by means of a spiral 1, to rapidly gyrate. The air, while gyrating, is, by the end $2^a$, directed, as indicated by the dotted lines 3 (Fig. 3), against the inclined blades of a small fan 4 mounted freely at the end of the spindle of the spiral 1 and causes said fan to rotate rapidly and split up and agitate the gyrating air. The air thereafter, passes along the tubular nozzle $i$, and through both the internal carbureter 6 and the annular space 7 between said carbureter and the nozzle. The stream of gyrating air passing through the carbureter 6 induces, in conjunction with gravity action, a flow of oil down the inclined oil nozzle 8 of the oil supply pipe 5 and mixes intimately with said oil and atomizes it and throws it under centrifugal action, outwardly against the wall of the carbureter in a finely divided condition. The air being heated above the flash point of the oil vaporizes it and the mixture of air and oil vapor issues in the form of a hollow conic stream from the inwardly tapering end $6^a$ of the carbureter 6, the whole impinging at the point 9 in the diverging outlet 10 communicating with the interior of the furnace. At the same time a portion of the heated gyrating air travels along the annular space 7 and is directed by the inwardly tapering end 11 of the nozzle $i$ toward the point 9 with the result that, at this point of impingement, the streams clash together. The converging streams to the point 9 are indicated by the dotted lines at Fig. 3.

As will be seen the film of more or less completely vaporized oil passing out through the carbureter 6 and which tends, under centrifugal action, to roll around the inner surface of said carbureter is blanketed, as it were, between the inner body of gyrating air issuing from the carbureter and the outer body of gyrating air issuing from the nozzle $i$. It will be noted that the carbureter 6 is located in the nozzle 5 a short distance from the fan 4 and also from the end of the nozzle. The carbureter is short and as will be seen is entirely open ended the atomized oil and vapor being rushed along by the heated air quickly through the carbureter the action of the hot air preventing deposit of carbon in the carbureter.

The oil nozzle 8 has a cleaning rod $8^a$ in it which can be pushed downward so as to clean the nozzle against the action of the spring $8^b$. Immediately pressure on the rod $8^a$ is relieved the spring $8^b$ moves the rod back to its original position.

For the purpose of heating the oil in the tank $c$ a portion of the hot air from the pipe $j$ can be taken off by the branch $j^2$ and directed against the underside of the tank $c$ so as to heat the same.

As shown in the sectional view Fig. 4, the carbureter 6 may be made in two portions one portion $6^b$ constituting a cap for the other portion and provided with an inwardly tapered end at $6^a$. In this case an annular stream of air is allowed to flow in from the space around the carbureter as indicated by the arrows 13. As a variation the carbureter 6 may be made (as at Figs. 5 and 6) with openings 14 through which air can enter from the annular space 7. In Fig. 5 the metal of the carbureter is cut and bent inward while in Fig. 6 the metal of the carbureter is cut and bent outward to form the openings 14.

The oil nozzle 8 may be made in any of the forms indicated at Figs. 7, 8, 9 and 10. In Fig. 7 the end of the nozzle is cut away at an angle as shown at 15 and is, or may be, provided with a cross bar 16 at the center. The nozzle is shown in side and front view Fig. 7. In Fig. 8 the nozzle 8 is shown in side and inverted plan views as being made with its lower end half cut away at 24 and provided with a division plate 25. In Fig. 9 as shown in side view and inverted plan view, the nozzle 8 can be made with a downwardly extending tongue or lip 17. As shown in side and front elevation at Fig. 10 the lip 17 may be made broader with two slots 18 therein which divide it into fingers.

These variations of the form of the nozzle may be used if desired their object being to divide the oil into two or more streams so as to facilitate its atomization.

For giving a larger heating surface for the air when passing through the hot chamber $e$ the conduit or pipe $j$ may be made as shown at Figs. 11 and 12, that is to say, it is formed as a kind of breeches pipe, being expanded in width and made to form two branches 19, 20, each of oval formation with connecting parts $j^{11}$ between the passages $j^{12}$ for hot gases. The two branches may be of the formation, as shown in cross section Fig. 14. In order to allow for expansion of the pipe $j$ the latter may be provided with an expansion joint, as shown at Fig. 13, this joint comprising a box 21 in which the end of the pipe $j$ can work telescopically, being packed with an asbestos or other packing ring 22.

Figs. 15, 16, and 17 show the invention applied to a gas producer of the Burton type. In this case air from any suitable source of supply, such as a fan or blower, is supplied to the air box 23 from which the air passes by means of the pipe 24 to an air nozzle $i$ with its internal carbureter 6 and by the pipe 25 to another air nozzle $i^2$ and carbureter 6. Air is also supplied by the pipe 27 to a pipe 28 disposed intermediate of the pipes 24, 25 and thence to a third air nozzle $i^3$ with carbureter 6 and oil nozzle 8. The pipes 24, 25 and 28, are located in hot chambers 29 at the top and sides of a fire brick heater 30 supported on standards 31 this heater having a combustion chamber $w$ as shown at Figs. 15 and 17 into which the flame from the carbureter and air nozzle $i^3$ is directed so as to heat the same and the hot gases of combustion pass into the lateral hot chambers 29 and also by the flue 32 into the top hot chamber 29 so as to heat the three pipes 24, 25, 28, the waste gases finally escaping through the flue 33 controllable by a damper. The structure constitutes an air heating device which heats the air up to the required temperature (somewhat above the oil flash point) for the air nozzles $i^2$ and $i^3$ and carbureters. The air supply for the pipe 27 can be controlled by a valve $27^a$ and the supplies for the air nozzles $i$, $i^2$, can be controlled by the valves $24^a$ and $25^a$. 34 is the oil supply tank and which supplies the oil to the various carbureters by means of the pipes 35 and 36. The top hot air chamber 29 is shown as covered by a metallic cover 38. The gas producer can be arranged in the vicinity of an ordinary furnace and the nozzles $i$, $i^2$, be directed into the furnace so that the hot gases produced will heat the same. When so desired the hot air can be cut off from the nozzles $i$, $i^2$, by the valves $24^a$, $25^a$, and cold air be supplied by the branches $24^b$, $25^b$.

Although we have shown the combustion chamber $x$ as heated by an oil gas flame from the nozzle $i^3$ it may be heated in other well known manner. We have also shown two nozzles, $i$, $i^2$, with their air supplies but one or more than two nozzles may be used.

Although we have described the apparatus as being specially suitable for heavy tar and pitch oils it can also be used for tar itself.

Having now fully described our invention what we claim and desire to secure by Letters Patent is:—

1. A method of burning heavy oils for heating purposes in which air is heated to a temperature above the flash point of the oil and is then caused to gyrate and while in a state of gyration is caused to atomize and vaporize oil delivered to the interior of a hollow member through which and also outside of which the gyrating air passes, whereby the oil in a finely divided state will be disposed between an inner and outer stream of air.

2. A method of burning heavy oils for heating purposes in which air is heated to a temperature above the flash point of the oil and is then caused to gyrate and while in a state of gyration is caused to atomize and vaporize oil delivered to the interior of a hollow member through which and also outside of which the gyrating air passes, whereby the oil in a finely divided state will be disposed between an inner and outer stream of air, the inner and outer bodies of gyrating air being caused to converge to a point where they clash together.

3. A method of burning heavy oils for heating purposes in which air is heated to a temperature above the flash point of the oil and is then caused to gyrate and is also agitated and while in a state of gyration and agitation is caused to atomize and vaporize oil delivered to the interior of a hollow member through which and also outside of which the gyrating air passes to blanket the vaporized oil between two streams of gyrating and agitated air.

4. An apparatus for burning heavy oils for heating purposes, embodying provisions for heating air to a temperature above the flash point of the oil, a hollow member, a second hollow member within and spaced from the first recited hollow member, means for supplying oil to the inner member, and means for gyrating and causing the heated air while in a state of gyration to atomize the oil delivered to the innermost hollow member and for causing the gyrating air to pass partly through the inner member and partly between the inner and outer member to blanket the vaporized oil between two streams of gyrating air.

5. An apparatus for burning heavy oils for heating purposes, embodying provisions for heating air to a temperature above the flash point of the oil, a hollow member, a second hollow member within and spaced from the first recited hollow member, means for supplying oil to the inner member, means for gyrating and causing the heated air while in a state of gyration to atomize the oil delivered to the innermost hollow member and for causing the gyrating air to pass partly through the inner member and partly between the inner and outer members to blanket the vaporized oil between two streams of gyrating air, and means for causing the divided streams of gyrating air to converge and clash together at a point in advance of the said members.

6. Apparatus for burning heavy oils comprising means for heating air to a temperature above the flash point of the oil, an air nozzle, means for directing the heated air to and through the nozzle, a carbureter of open tubular formation located within the air nozzle, means for conducting oil to the interior of the carbureter, oil supply means, and means for imparting a gyrating movement to the air through and on the outside of said carbureter.

7. Apparatus for burning heavy oils comprising tubular means externally heated for heating air to a temperature above the flash point of the oil, an air nozzle, means for directing the heated air to and through the nozzle, means for causing the heated air to gyrate, a carbureter located within the air nozzle, means for conducting oil to the interior of the carbureter, oil supply means, and means for causing the air to gyrate through the said carbureter.

8. Apparatus for burning heavy oils comprising means for heating air to a temperature above the flash point of the oil, an air nozzle, means for directing the heated air to and through the nozzle, a carbureter located within the air nozzle, means for conducting oil to the interior of the carbureter at an angle thereto, oil supply means, and means for causing the heated air to gyrate through and around the carbureter.

9. Apparatus for burning heavy oils comprising means for heating air to a temperature above the flash point of the oil, an air nozzle, means for directing the heated air to and through the nozzle, means for causing the heated air to gyrate, a carbureter located within the air nozzle, means for conducting oil to the interior of the carbureter, oil supply means, and rotary fan means for imparting an agitation to the gyrating heated air as it flows both through and around the carbureter.

10. Apparatus for burning heavy oils comprising means for heating air to a temperature above the flash point of the oil, an air nozzle, means for directing the heated air to and through the nozzle, means for causing the heated air to gyrate, the air gyrating and agitating means being located within the air nozzle, a carbureter located within the air nozzle, means for conducting oil to the interior of the carbureter, oil supply means, and rotary fan means for agitating the gyrating heated air as it flows both through and around the carbureter, the air gyrating and agitating means being located within the air nozzle.

11. Apparatus for burning heavy oils comprising means for heating air to a temperature above the flash point of the oil, an air nozzle, means for directing the heated air to and through the nozzle, means for causing the heated air to gyrate, rotary fan means for agitating the gyrating heated air, the air gyrating and agitating means being located within the air nozzle, a carbureter located within the air nozzle in advance of the air agitating and gyrating means, means for conducting oil to the interior of the carbureter, and oil supply means.

12. Apparatus for burning heavy oils comprising means heated by waste hot gases for heating air to a temperature above the flash point of the oil, an air nozzle, means for directing the heated air to and through the nozzle, a carbureter located within the air nozzle, means for conducting oil to the interior of the carbureter, oil supply means, and means for causing the heated air to gyrate through and around the carbureter.

In testimony whereof we affix our signatures in presence of two witnesses.

WM. M. BURDON.
MATTHEW M. BURDON.

Witnesses:
WM. BROWN,
R. G. CALDERHEAD.